(12) United States Patent  
Steinman et al.

(10) Patent No.: US 6,591,349 B1
(45) Date of Patent: Jul. 8, 2003

(54) MECHANISM TO REORDER MEMORY READ AND WRITE TRANSACTIONS FOR REDUCED LATENCY AND INCREASED BANDWIDTH

(75) Inventors: Maurice B. Steinman, Marlborough, MA (US); Gregg A. Bouchard, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 09/653,094

(22) Filed: Aug. 31, 2000

(51) Int. Cl.$^7$ ............................................... G06F 12/00
(52) U.S. Cl. ........................... 711/154; 711/5; 711/105; 711/167
(58) Field of Search ............................... 711/5, 105, 108, 711/111, 117, 151, 154, 167, 169

(56) References Cited

U.S. PATENT DOCUMENTS

| | | | | |
|---|---|---|---|---|
| 5,634,112 | A | * 5/1997 | Thome et al. | 711/154 |
| 6,295,586 | B1 | * 9/2001 | Novak et al. | 365/203 |
| 6,321,233 | B1 | * 11/2001 | Larson | 707/201 |
| 6,378,049 | B1 | * 4/2002 | Stracovsky et al. | 710/8 |

OTHER PUBLICATIONS

U.S. patent application Ser. No. 09/653,642, filed Aug. 31, 2000, Apparatus And Method For Interfacing A High Speed Scan–Path With Slow–Speed Test Equipment.
U.S. patent application Ser. No. 09/652,322, filed Aug. 31, 2000, Priority Rules For Reducing Network Message Routing Latency.
U.S. patent application Ser. No. 09/652,703, filed Aug. 31, 2000, Scalable Directory Based Cache Coherence Protocol.
U.S. patent application Ser. No. 09/652,391, filed Aug. 31, 2000, Scalable Efficient I/O Port Protocol.
U.S. patent application Ser. No. 09/652,552, filed Aug. 31, 2000, Efficient Translation Lookaside Buffer Miss Processing In Computer Systems With A Large Range Of Page Sizes.
U.S. patent application Ser. No. 09/651,949, filed Aug. 31, 2000, Fault Containment And Error Recovery Techniques In A Scalable Multiprocessor.
U.S. patent application Ser. No. 09/652,834, filed Aug. 31, 2000, Speculative Directory Writes in A Directory Based Cache Coherent Nonuniform Memory Access Protocol.
U.S. patent application Ser. No. 09/652,314, filed Aug. 31, 2000, Special Encoding Of Known Bad Data.
U.S. patent application Ser. No. 09/652,165, filed Aug. 31, 2000, Broadcast Invalidate Scheme.

(List continued on next page.)

Primary Examiner—Matthew Kim
Assistant Examiner—Woo H. Choi

(57) ABSTRACT

A system and method is disclosed to increase computer memory system performance by reducing lost clock cycles caused by bus turnarounds. The computer system contains one or more processors each including a memory controller containing a page table, the page table organized into a plurality of rows with each row able to store an address of an open memory page. The memory controller also contains a precharge queue, a Row-address-select ("RAS") queue, a Column-address-select ("CAS") Read queue, and a CAS Write queue. The CAS Read queue and CAS Write queue outputs are connected to a 2-to-1 multiplexer. The 2-to-1 multiplexer streams groups of read requests and groups of write requests to main memory resulting in fewer lost clock cycles caused by bus turnarounds. The memory controller places system memory read requests into the CAS Read queue and system memory write requests into the CAS Write queue.

28 Claims, 7 Drawing Sheets

OTHER PUBLICATIONS

U.S. patent application Ser. No. 09/652,704, filed Aug. 31, 2000, Mechanism To Track All Open Pages In A DRAM Memory System.

U.S. patent application Ser. No. 09/653,093, filed Aug. 31, 2000, Programmable DRAM Address Mapping Mechanism.

U.S. patent application Ser. No. 09/652,323, filed Aug. 31, 2000, Computer Architecture And Sytem For Efficient Management Of Bi–Directional Bus.

U.S. patent application Ser. No. 09/652,452, filed Aug. 31, 2000, An Efficient Address Interleaving With Simultaneous Multiple Locality Options.

U.S. patent application Ser. No. 09/653,092, filed Aug. 31, 2000, A High Performance Way Allocation Strategy For A Multi–Way Associative Cache System.

U.S. patent application Ser. No. 09/651,948, filed Aug. 31, 2000, Method And System For Absorbing Defects In High Performance Microprocessor With A Large N–Way Set Associative Cache.

U.S. patent application Ser. No. 09/652,324, filed Aug. 31, 2000, A Method For Reducing Directory Writes And Latency In A High Performance, Directory–Based, Coherency Protocol.

U.S. patent application Ser. No. 09/652,325, filed Aug. 31, 2000, System For Minimizing Memory Bank Conflicts In A Computer System.

U.S. patent application Ser. No. 09/651,945, filed Aug. 31, 2000, Computer Resource Management And Allocation System.

U.S. patent application Ser. No. 09/653,643, filed Aug. 31, 2000, Input Data Recovery Scheme.

U.S. patent application Ser. No. 09/652,451, filed Aug. 31, 2000, Fast Lane Prefetching.

U.S. patent application Ser. No. 09/652,480, filed Aug. 31, 2000, Mechanism For Synchronizing Multiple Skewed Source–Synchronous Data Channels With Automatic Initialization Feature.

U.S. patent application Ser. No. 09/651,924, filed Aug. 31, 2000, Mechanism To Control The Allocation Of An N–Source Shared Buffer.

U.S. patent application Ser. No. 09/652,315, filed Aug. 31, 2000, Chaining Directory Reads And Writes To Reduce DRAM Bandwidth In A Directory Based CC–NUMA Protocol.

* cited by examiner

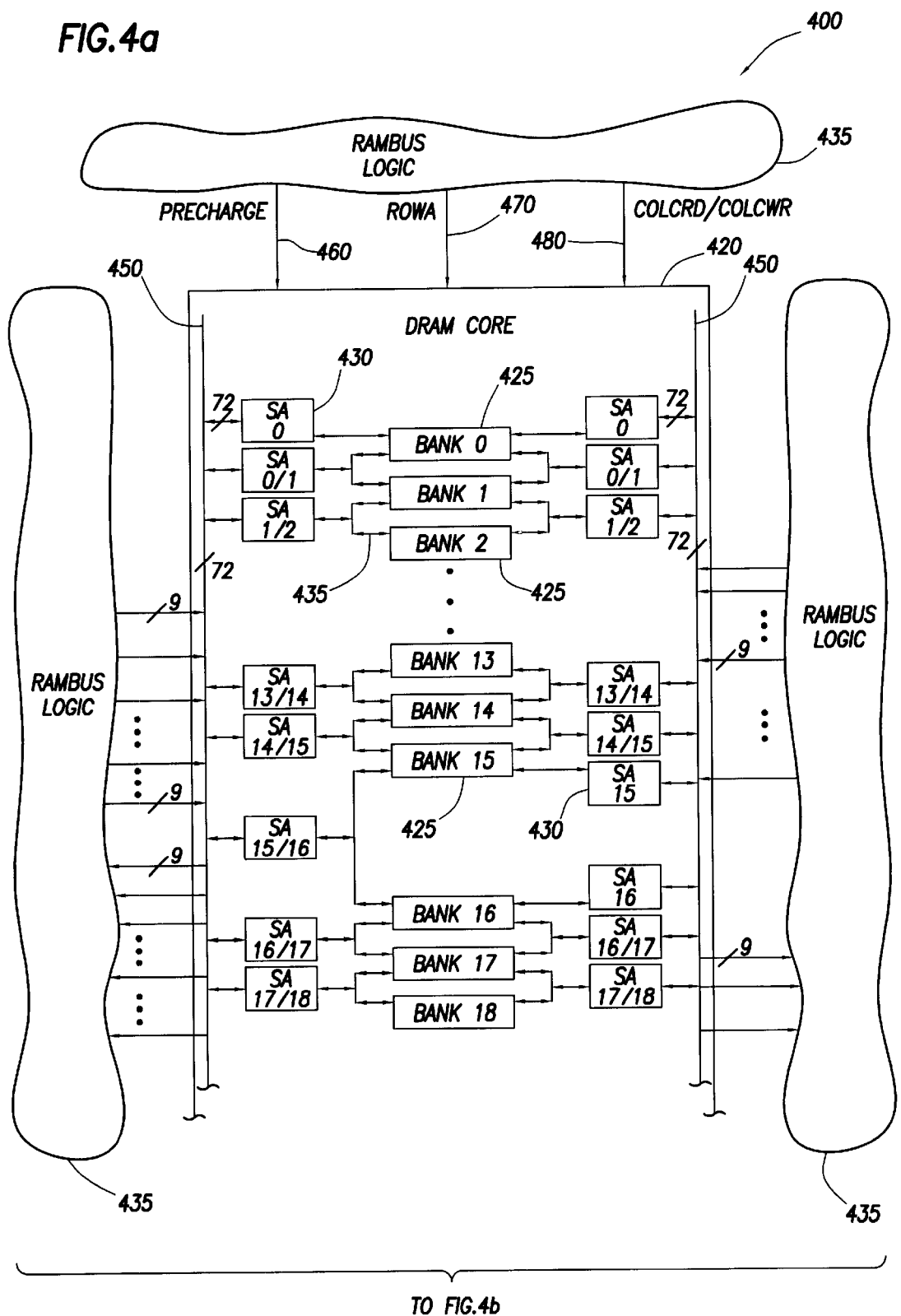

MECHANISM TO REORDER MEMORY READ AND WRITE TRANSACTIONS FOR REDUCED LATENCY AND INCREASED BANDWIDTH

CROSS-REFERENCE TO RELATED APPLICATIONS

This application relates to the following commonly assigned co-pending applications entitled:

Apparatus And Method For Interfacing A High Speed Scan-Path With Slow-Speed Test Equipment, Ser. No. 09/653,642, filed Aug. 31, 2000; "Priority Rules For Reducing Network Message Routing Latency," Ser. No. 09/652,322, filed Aug. 31, 2000; "Scalable Directory Based Cache Coherence Protocol," Ser. No. 09/652,703, filed Aug. 31, 2000; "Scalable Efficient I/O Port Protocol," Ser. No. 09/652,391, filed Aug. 31, 2000; "Efficient Translation Lookaside Buffer Miss Processing In Computer Systems With A Large Range Of Page Sizes," Ser. No. 09/652,552, filed Aug. 31, 2000; "Fault Containment And Error Recovery Techniques In A Scalable Multiprocessor," Ser. No. 09/651,949, filed Aug. 31, 2000; "Speculative Directory Writes In A Directory Based Cache Coherent Nonuniform Memory Access Protocol," Ser. No. 09/652,834, filed Aug. 31, 2000; "Special Encoding Of Known Bad Data," Ser. No. 09/652,314, filed Aug. 31, 2000; "Broadcast Invalidate Scheme," Ser. No. 09/652,165, filed Aug. 31, 2000; "Mechanism To Track All Open Pages In A DRAM Memory System," Ser. No. 09/652,704, filed Aug. 31, 2000; "Programmable DRAM Address Mapping Mechanism," Ser. No. 09/653,093, filed Aug. 31, 2000; "Computer Architecture And System For Efficient Management Of Bi-Directional Bus," Ser. No. 09/652,323, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a computer system that includes one or more random access memory ("RAM") devices. More particularly, the invention relates to a computer system with a memory controller that reorders read and write requests for improved memory system performance. Still, more particularly, the invention relates to a memory controller that receives read and write requests in an arbitrary order and streams groups of reads and groups of writes to the memory system.

2. Background of the Invention

Superscalar processors achieve high performance by executing multiple instructions per clock cycle and by choosing the shortest possible clock cycle consistent with the design. On the other hand, superpipelined processor designs divide instruction execution into a large number of subtasks which can be performed quickly, and assign pipeline stages to each subtask. By overlapping the execution of many instructions within the pipeline, superpipelined processors attempt to achieve high performance.

Superscalar processors demand low memory latency due to the number of instructions attempting concurrent execution and due to the increasing clock frequency (i.e., shortening clock cycle) employed by the processors. Many of the instructions include memory operations to fetch ("read") and update ("write") memory operands. The memory operands must be fetched from or conveyed to memory, and each instruction must originally be fetched from memory as well. Similarly, processors that are superpipelined demand low memory latency because of the high clock frequency employed by these processors and the attempt to begin execution of a new instruction each clock cycle. It is noted that a given processor design may employ both superscalar and superpipelined techniques in an attempt to achieve the highest possible performance characteristics.

Processors are often configured into computer systems that have a relatively large and slow main memory. Typically, multiple random access memory ("RAM") modules comprise the main memory system. The RAM modules may be Dynamic Random Access Memory ("DRAM") modules or RAMbus™ Inline Memory Modules ("RIMM") that incorporate a DRAM core (see "RAMBUS Preliminary Information Direct RDRAM™", Document DL0060 Version 1.01; "Direct Rambus™ RIMM™ Module Specification Version 1.0", Document SL-0006-100; "Rambus® RIMM™ Module (with 128/144 Mb RDRAMs)" Document DL00084 Version 1.1, all of which are incorporated by reference herein). The large main memory provides storage for a large number of instructions and/or a large amount of data for use by the processor, providing faster access to the instructions and/or data than may be achieved for example from a disk storage. However, the access times of modern RAMs are significantly longer than the clock cycle length of modem processors. The memory access time for each set of bytes being transferred to the processor is therefore long. Accordingly, the main memory system is not a low latency system. Processor performance may suffer due to high memory latency.

Many types of RAMs employ a "page mode" which allows for memory latency to be decreased for transfers within the same "page". Generally, RAMs comprise memory arranged into rows and columns of storage. A first portion of the address identifying the desired data/instructions is used to select one of the rows (the "row address"), and a second portion of the address is used to select one of the columns (the "column address"). One or more bytes residing at the selected row and columns are provided as output of the RAM. Typically, the row address is provided to the RAM first, and the selected row is placed into a temporary sense amplifier buffer within the RAM. The row of data that is stored in the RAM's sense amplifier is referred to as a page. Thus, addresses having the same row address are said to be in the same page. Subsequent to the selected row being placed into the sense amplifier buffer, the column address is provided and the selected data is output from the RAM. A page hit occurs if the next address to access the RAM is within the same row stored in the sense amplifier buffer. Thus, the next access may be preformed by providing the column portion of the address only, omitting the row address transmission. The next access to a different column may therefore be performed with lower latency, saving the time required for transmitting the row address because the page corresponding to the row has already been activated. The size of a page is dependent upon the number of columns within the row. The row, or page, stored in the sense amplifier within the RAM is referred to as an "open page", since accesses within the open page can be performed by transmitting the column portion of the address only.

Unfortunately, the first access to a given page generally does not occur to an open page, thereby incurring a higher memory latency. Even further, the first access may experience a page miss. A page miss can occur if the sense amplifier has another particular page open, and the particular page must first be closed before opening the page containing the current access. A page miss can also occur if the sense amplifier is empty. Often, this first access is critical to maintaining performance in the processors within the computer system, as the data/instructions are immediately needed to satisfy a miss. Instruction execution may stall because of the page miss while the page containing the current access is being opened.

A memory controller in the processor contains a page table that tracks open pages. Read and write requests to main memory from the processor access the page table to determine whether the page needed for the write request is open. If the page is open, the read or write request is placed into a read/write queue and then issued to the main memory. Because read requests and write requests appear in a random fashion sequentially throughout the queue, the memory controller is unable to stream groups of read requests and groups of write requests to the main memory. Thus, requests to main memory are typically intermixed reads and writes.

Intermixing read requests and write requests to main memory causes a clock cycle to be "lost" when a memory write is immediately followed by a memory read. This phenomenon, called bus turnaround, occurs because the structure of RAM requires an extra clock cycle to make sure that all of the data is written into the memory before a read operation can be performed. For example, if a write operation is followed by a read operation from the same address, a lost clock cycle is needed so that the "new" data will be written to the specified address before the read operation is performed on the data stored at the same address. In systems where bus turnaround occurs frequently, the lost clock cycles on bus turnaround can significantly reduce the bandwidth of the system.

Lost clock cycles due to bus turnaround are common in memory controllers that use a unified read/write queue because read requests and write requests issued from the unified queue to main memory are randomly intermixed. Thus, a system and method is needed that is able to stream groups of read requests and groups of write requests to main memory and reduce lost clock cycles from bus turnaround.

BRIEF SUMMARY OF THE INVENTION

The problems noted above are solved in large part by a computer system that contains one or more processors, each processor including a memory controller containing a page table, the page table organized into a plurality of rows with each row able to store an address of an open memory page. The memory controller also contains a precharge queue, a Row-address-select ("RAS") queue, a Column-address-select ("CAS") Read queue, and a CAS Write queue. The CAS Read queue and CAS Write queue outputs are connected to a 2-to-1 multiplexer. The 2-to-1 multiplexer streams groups of read requests and groups of write requests to main memory resulting in fewer lost clock cycles caused by bus turnarounds. A RIMM module containing RDRAM devices is coupled to the processor, each RDRAM containing a plurality of memory banks.

The memory controller places system memory read requests into the CAS Read queue and system memory write requests into the CAS Write queue. The memory controller places read requests or write requests to system memory in the precharge queue resulting from a page miss caused by the address of an open memory page occupying the same row of the page table as the address of the system memory access resulting in the page miss, each entry in the precharge queue closing the page in the memory bank referenced by the address stored in the page table row. The memory controller also places read requests or write requests to system memory in the RAS queue resulting from a page miss caused by a row of the page table not containing any open memory page address, the entry in the RAS queue activating the page from the memory bank that caused the page miss and storing the page address into the row of the page table not containing any open memory page address to indicate that the page is open. An entry in the precharge queue after completion is then placed into the RAS queue. An entry in the RAS queue after completion is placed into the CAS Read queue or CAS Write queue.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
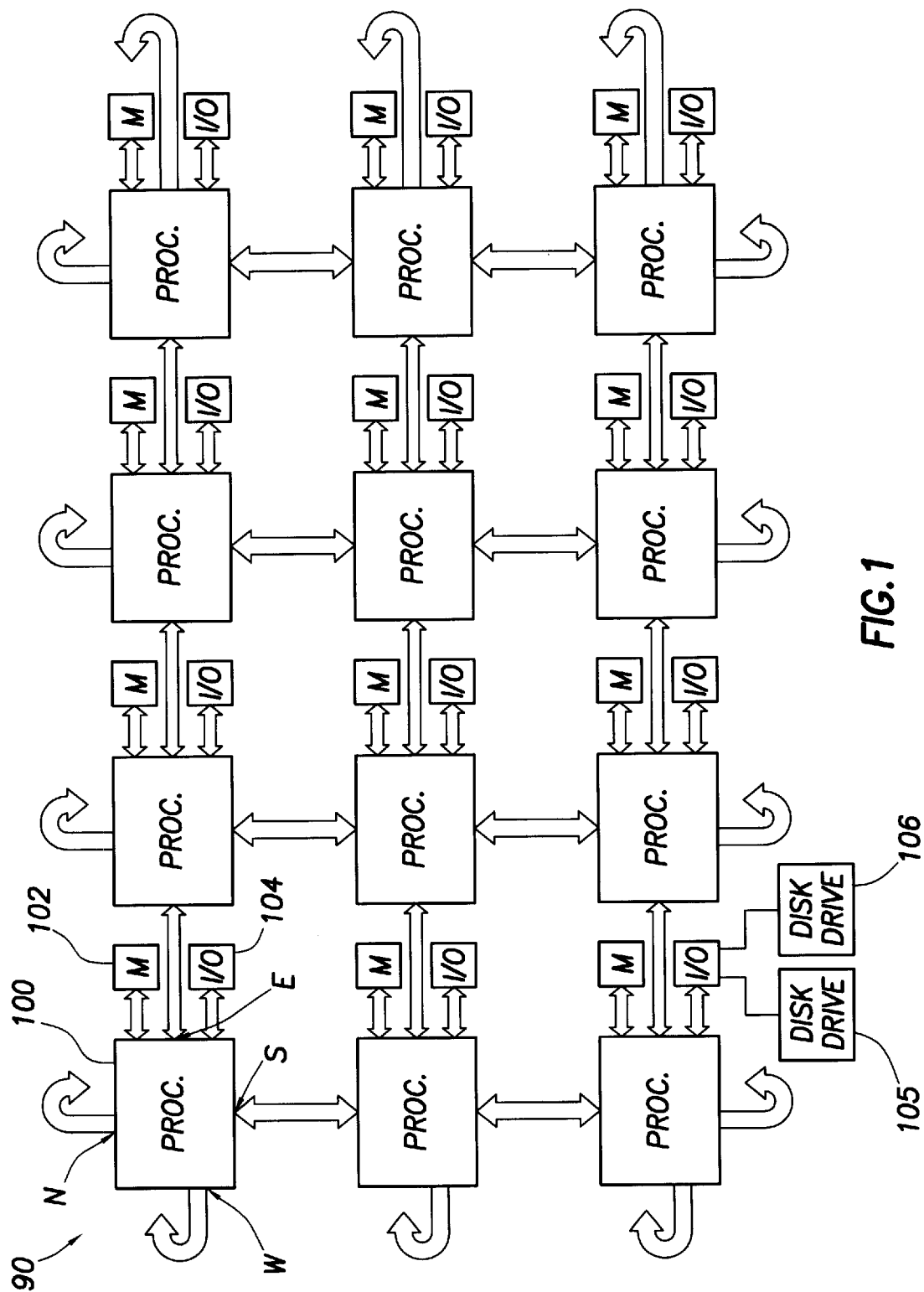
FIG. 1 shows a system diagram of a plurality of processors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes 12 processors 100, each processor coupled to a memory 102 and an I/O controller 104. Although the computer system 90 is shown as a multiple processor system in FIG. 1, it should be understood that the present invention also may be implemented on a single processor system, and thus the following disclosure is intended to be illustrative of the preferred embodiment of practicing the invention, and is not intended to imply that the invention is limited to use in a multi-processor system.

According to the preferred embodiment, each processor 100 preferably includes four ports for connection to adjacent processors. The inter-processor ports are designated "North," "South," "East," and "West" in accordance with the well-known Manhattan grid architecture. As such, each processor 100 can be connected to four other processors. The processors on both end of the system layout wrap around and connect to processors on the opposite side to implement a 2D torus-type connection. Although 12 processors 100 are shown in the exemplary embodiment of FIG. 1, any desired number of processors (e.g. 256) can be included.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are coupled to the processor through a Rambus™ Interface Memory Modules ("RIMMs").

In general, computer system 90 can be configured so that any processor 100 can access its own memory 102 and I/O devices, as well as the memory and I/O devices of all other processors in the network. Preferably, the computer system may have dedicated physical connections between each processor resulting in low interprocessor communication times and improved memory and I/O device access reliability. If dedicated physical connections are not present between each pair of processors, a pass-through or bypass path is preferably implemented in each processor that permits accesses to a processor's memory and I/O devices by another processor through one or more pass-through processors.

Figure 2A:
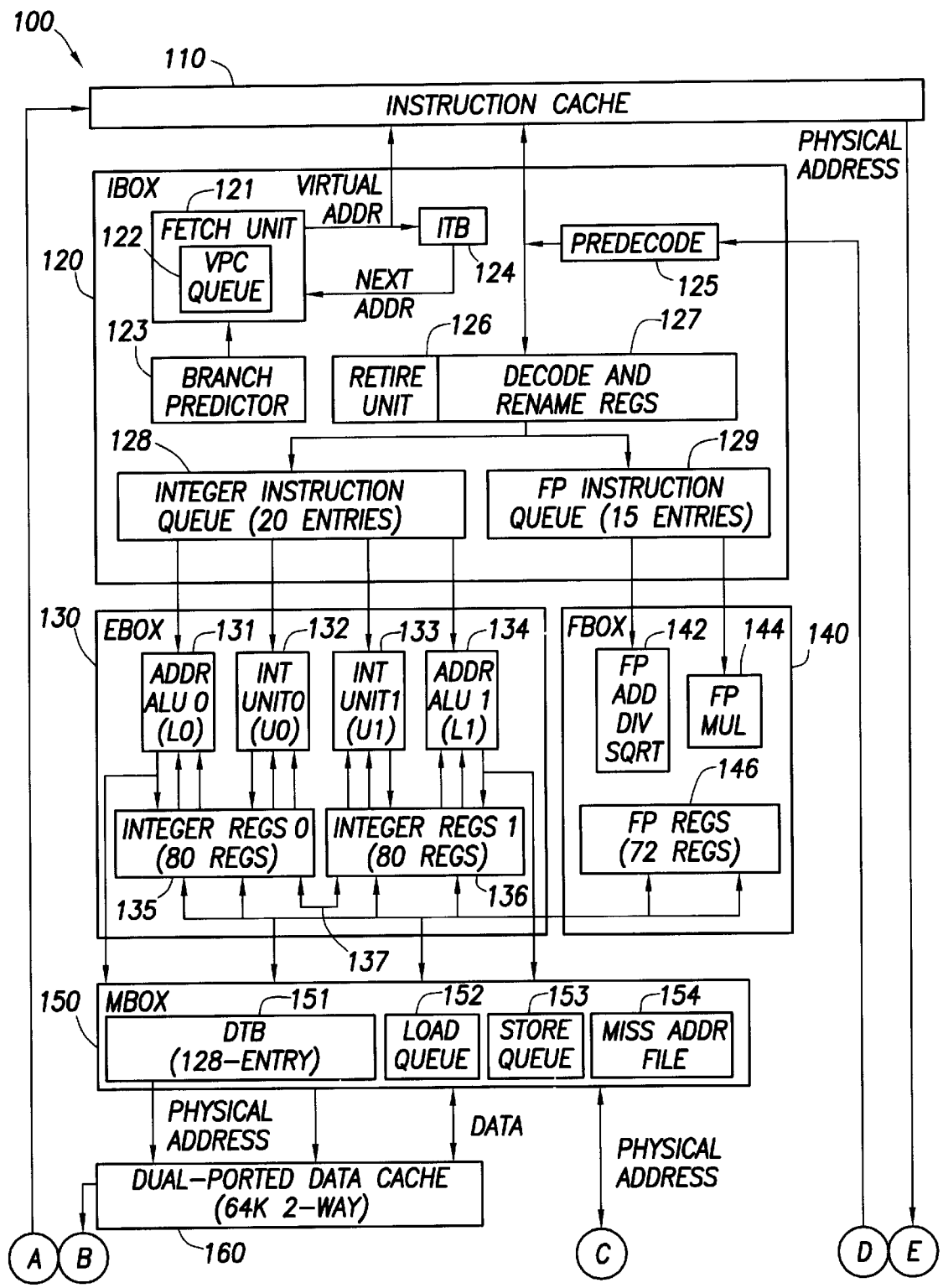
FIGS. 2a and 2b show a block diagram of a processor of FIG. 1 that implements the preferred embodiment to track open pages in the memory system.
Figure 2B:
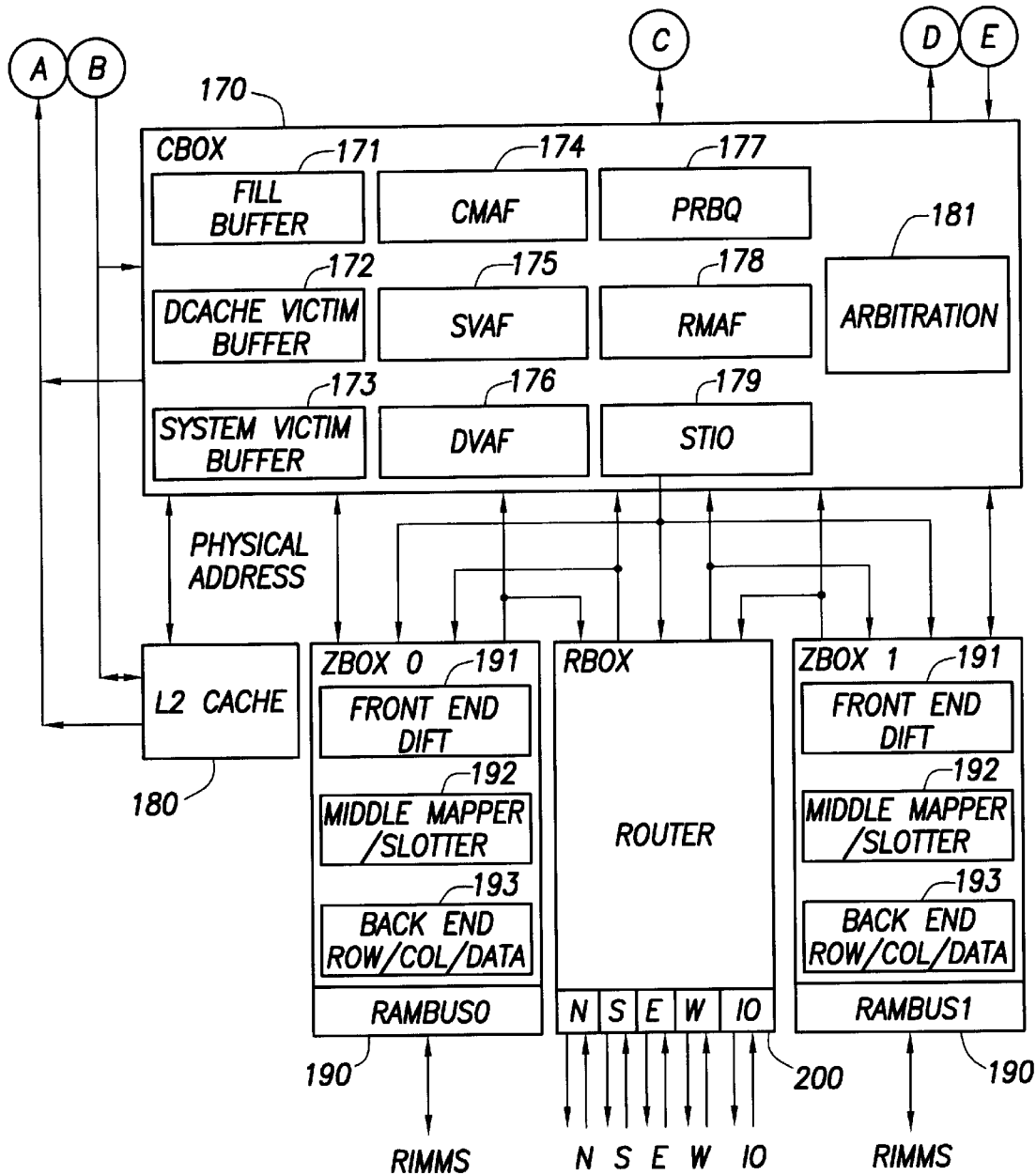

Referring now to FIGS. 2a and 2b, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other control logic as shown in FIGS. 2a and 2b. The instruction cache control logic 110 communicates with the Ibox 120, Cbox 170, and L2 Cache 180. In addition to communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer ("ITB") 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The Ibox 120 uses the branch predictor 123 to handle branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor preferably includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been wrong (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The Instruction Translation Buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware units: integer and floating-point registers, memory, and internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 preferably perform the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes Arithmetic Logic Units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and single secondary-level, unified instruction/data ("L2") cache 180. (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox that processes the data and instructions before sending to another functional unit or the L1cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, MAF, and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus™ memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into RAMbus™ device format by device, bank, row, and column. The middle mapper 192 also maintains an open-page table to track all open pages and to close pages on demand if bank conflicts arise. The mapper 192 also schedules RAMbus™ transactions such as timer-base request queues. The Zbox back end 193 preferably packetizes the address, control, and data into RAMbus™ format and provides the electrical interface to the RAMbus™ devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Figure 3:
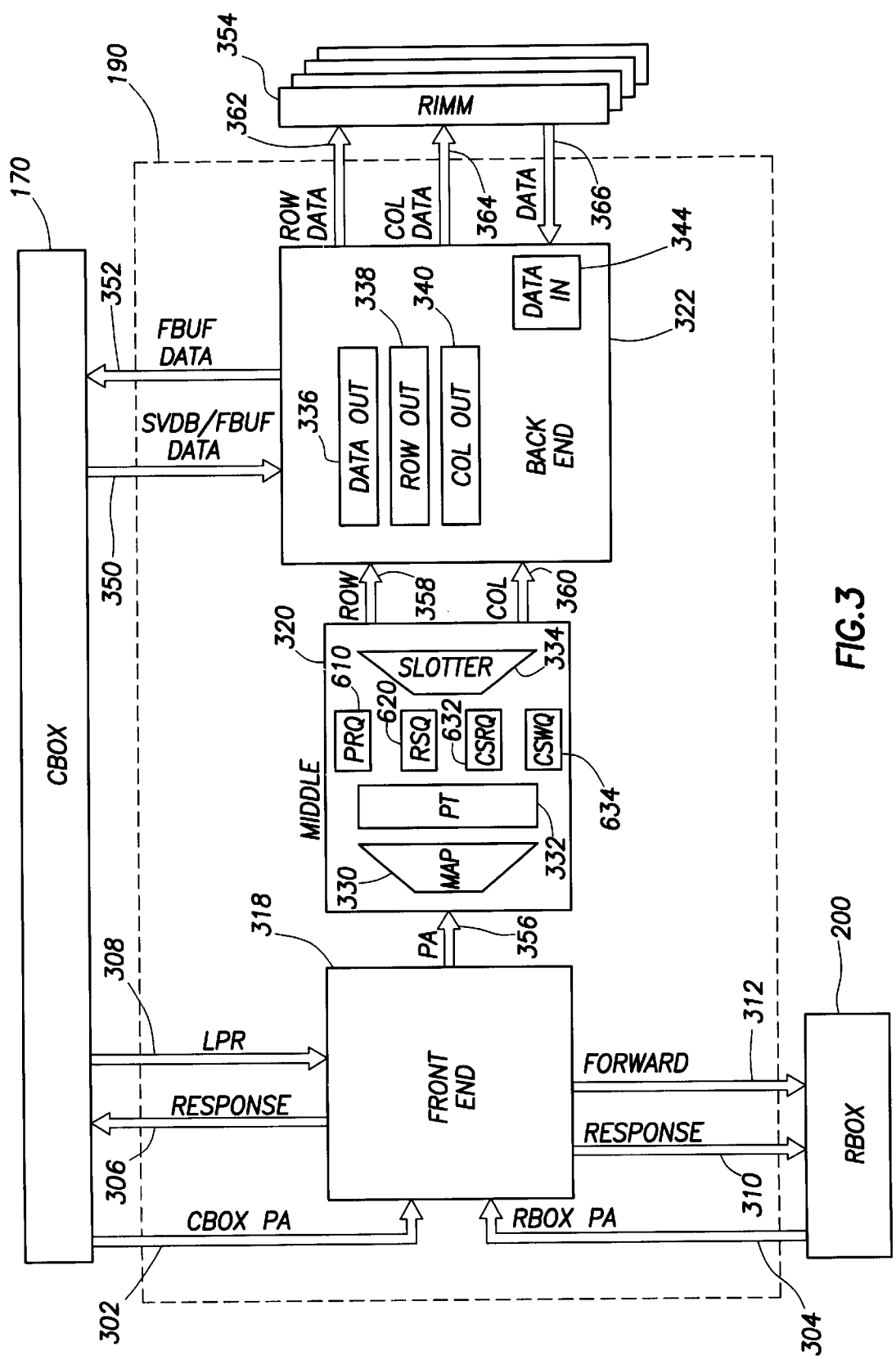
FIG. 3 is a block diagram of the memory controller Zbox shown in FIG. 1b, constructed in accordance with the preferred embodiment.

Referring now to FIG. 3, a more detailed description of the Zbox front end, middle and back end hardware is shown. The front end 318 of the Zbox 190 may receive a physical address 302 from the Cbox 170 or a physical address 304 from the Rbox 200. The front end also generates and transmits Response messages 306 and 310 to the Cbox 170 and Rbox 200. Forward coherence messages 312 are generated by the front end 318 and transmitted to the Rbox 200. The Cbox 170 transmits Local Probe Responses ("LPR") 308 to the front end.

Zbox middle section 320 consists of a map 330 that maps the Physical Address ("PA") 356 received from the front end into preferably RAMbus™ device format by device, bank, row and column. The map 330 also maintains a 1024-entry page table 332 that tracks all activated pages for the processor. In one embodiment in which sense amplifiers are shared between banks of each RAMbus™ DRAM device, for each entry in the page table 332 there are two associated bank active bits indicating which currently active bank the page entry is from. The bank active bits may be part of the page table 332 or implemented as a separate table in the map 330 that is accessed in parallel with the page table 332. The map 330 closes pages in the page table 332 on demand if there are bank conflict issues as discussed below. A slotter 334 schedules RAMbus™ transactions by updating request queues PRQ 610, RSQ 620, CSRQ 632, and CSWQ 634. PRQ 610 is a Precharge queue containing page close requests. RSQ 620 is a RAS queue ("Row-address-select") queue that contains page activation requests. CSRQ 632 is a CAS ("Column-address-select") read queue that contains memory read requests to active pages. CSWQ 634 is a CAS write queue that contains memory write requests to active pages. These four queues are described in greater detail below in conjunction with FIG. 6.

The Zbox back end 322 packetizes address, control and data into RAMbus™ format. The Zbox back end includes registers data out 336, row out 338 and column out 340. The data in buffer 344 takes inbound data from RAMbus™ Inline Memory Modules ("RIMM") and converts this to the appropriate format accessible to the processor. The back end 322 receives from the Cbox 170 system victim and fill buffer data 350 and outputs fill buffer data 352 to the Cbox. Back end 322 receives row 358 and column 360 address from the middle section and converts the octaword formats to 8-byte RAMbus™ format.

Figure 4B:
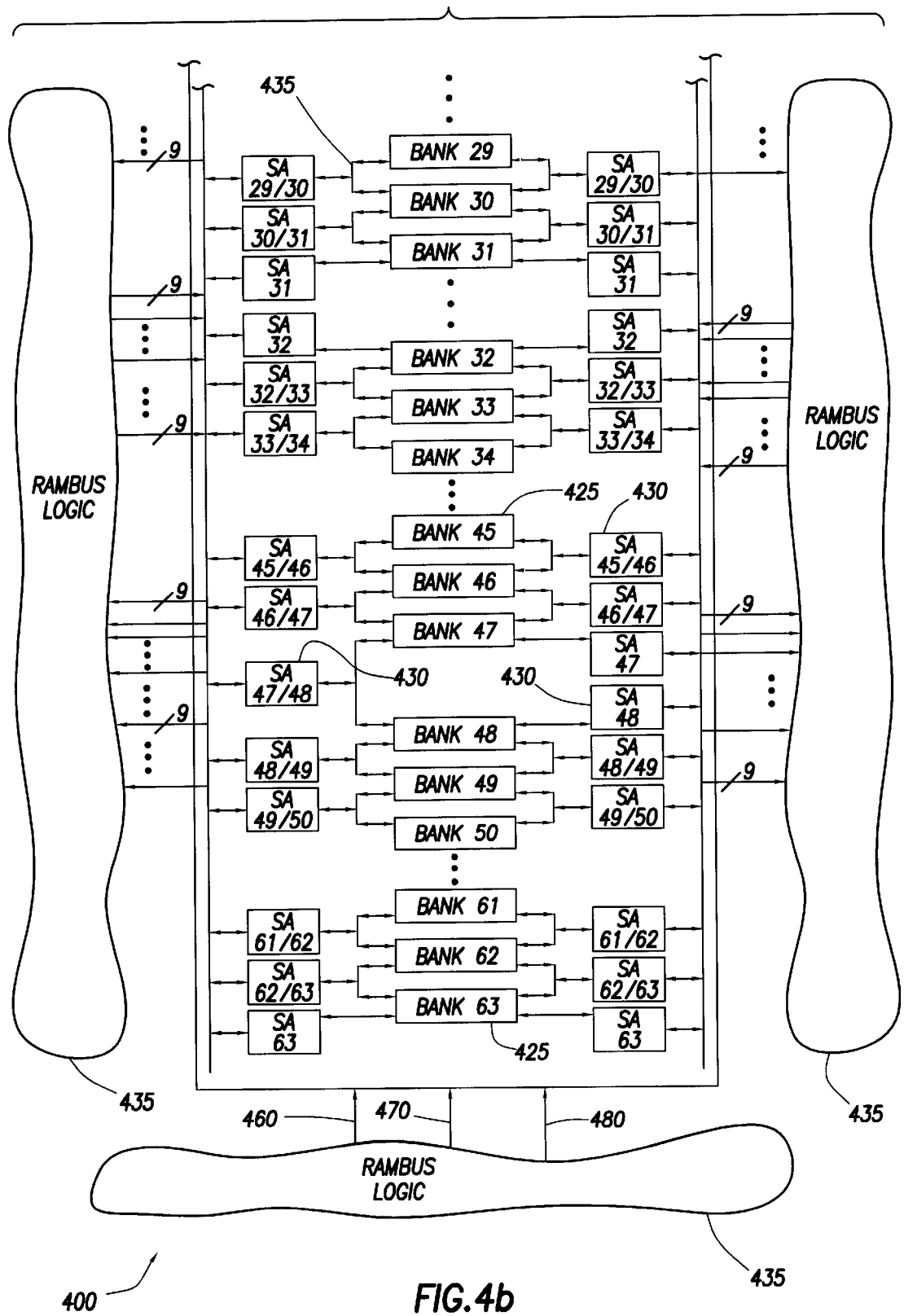
FIG. 4 is a diagram showing a RAMbus™ Dynamic Random Access Memory device of the preferred embodiment.

Referring now to FIG. 4, a RAMbus™ DRAM ("RDRAM") device 400 includes a DRAM core 420 containing memory banks 425 and sense amplifiers 430 and RAMbus™ interface logic 435 that permits an external control device to preferably access the DRAM core 420 at up to 1.6 gigabytes/second. A number of memory banks 425, preferably sixty-four are shown in FIG. 4 although a DRAM core 420 with 16, 32, 128, or a multiplier of 64 may be used in the preferred embodiment. Each DRAM core 420 preferably contains 64 sense amplifiers 430, each sense amplifier 430 shared 435 between two adjacent banks 425 of the DRAM core 420 (except for sense amplifiers 0, 31, 32, and 63 that are not shared). The sense amplifiers 430 are connected through data paths DQA and DQB 450 that read and write data to RAMbus™ interface logic 435 that is then output to the memory controller 190. Control lines Precharge 460, RowA 470, and ColCRd/ColCWr 480, respectively, causes a memory bank to close a page, activate a page, or read/write a page to the memory bank through DQA and DQB 450.

In the preferred embodiment, the 64 Mbyte DRAM core 420 of the RDRAM 400 is divided into 64 one-Mbyte banks 425, each organized as 512 rows, with each row containing 128 columns and each column containing sixteen bytes. Thus, each row contains 2 Kilobytes of data (128*16=2 Kilobytes). A column is the smallest unit of data that can be addressed in a memory bank. The RDRAM 400 preferably contains 64 sense amplifier buffers 430. Each sense amplifier buffer 430 is capable of storing 1024 bytes (512 for DQA and 512 for DQB) and in the preferred embodiment can hold one-half of one row of a RDRAM memory bank 425. The number of bytes that can be stored in two sense amplifiers 430 is called the page size of the RDRAM device 400 because each memory bank 425 has access to two sense amplifiers 430. Thus, the page size for the preferred embodiment is 2048 bytes (2 Kilobytes). In other embodiments of the invention, a page can be 1 Kilobyte or 4 Kilobytes based on the storage capacity of the sense amplifier. A sense amplifier may hold any of the 512 half-rows of an associated memory bank. However, as mentioned above, each sense amplifier is shared 435 between two adjacent banks of the RDRAM. This introduces the restriction that adjacent banks 425 in the preferred embodiment may not be simultaneously accessed.

Control line Precharge 460 coupled to the DRAM core 420 transmits a precharge command that, along with the (RDRAM device, memory bank) address, causes the selected memory bank 425 to release its two associated sense amplifiers 430. This permits a different row in that memory bank to be activated, or permits adjacent memory banks to be activated. The RowA 470 control line coupled to the DRAM core 420 transmits an Activate command that, along with the (RDRAM device, memory bank) and row address, causes the selected row of the selected bank to be loaded into its associated sense amplifiers 430 (two 512 byte sense amplifiers for DQA and two 512 byte sense amplifiers for DQB). The ColCRd 480 command is issued to a (RDRAM device, memory bank, column) to transfer a column of data (16 bytes) from one of the two sense amplifiers 430 shared by the memory bank 425 through the DQA/DQB 450 data paths to the RAMbus™ interface logic 435. The data is then output to the Zbox memory controller 190. A ColCWr 480 command transfers a column of data from the Zbox memory controller 190 through the RAMbus™ interface logic 435 and DQA/DQB data paths 450 to one of the two sense amplifiers 430 for the (RDRAM device, memory bank, column).

Figure 5:
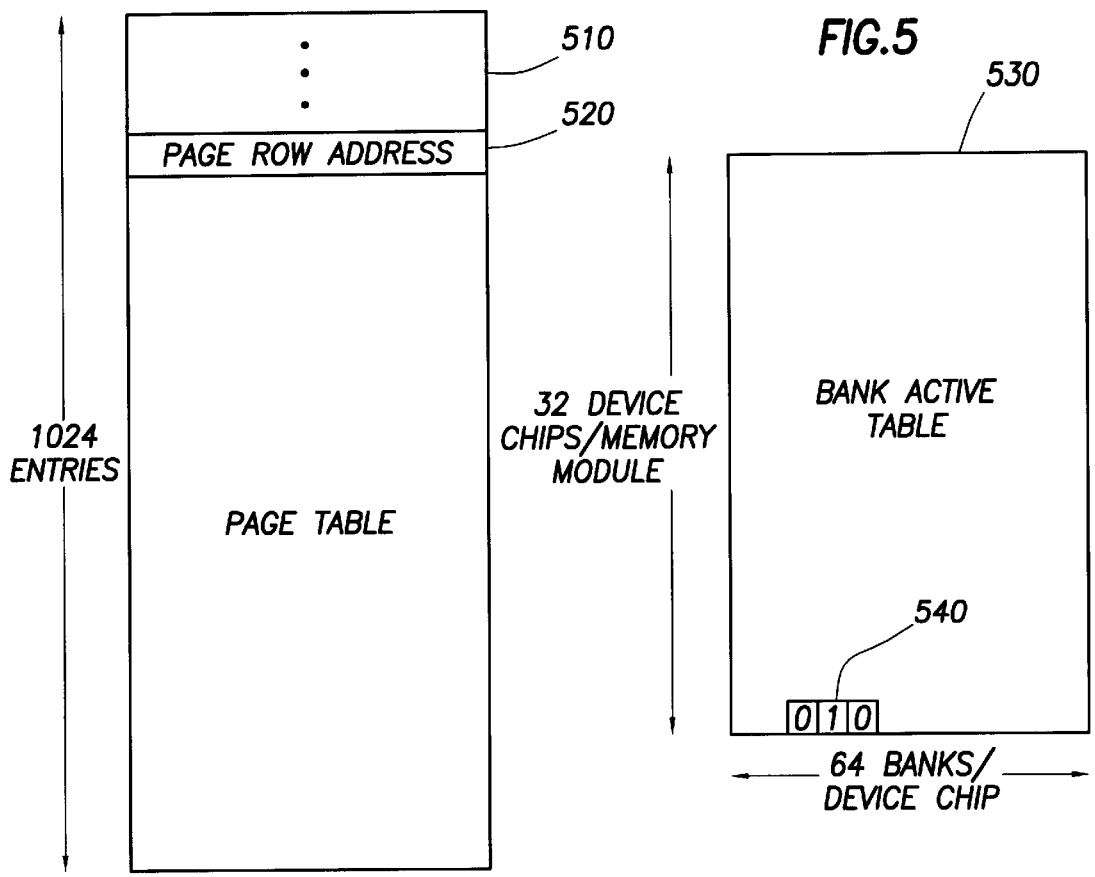
FIG. 5 shows the page table array structure and valid bit table that tracks page activation status.

Turning now to FIG. 5, a 1024 entry page table 510 to track page activation status and a 32×64 bit bank active table 530 to indicate the selected bank are shown. In the preferred embodiment, the page table 510 is located in the middle section 320 of the Zbox memory controller 190 in each processor. The bank active table 530 may be incorporated into the page table 510 by appending two bits to each entry of the page table 510. In the preferred embodiment the bank active table 530 is implemented as a separate 32×64 bit table and may be stored in the map 330 of the middle section 320 in the Zbox memory controller 190 shown in FIG. 3. Two bits are required for each page table entry because each sense amplifier 430 is shared by two memory banks 425 and the bits identify which memory bank 425 the open page is from.

Preferably, the page table 510 allows a maximum of 1024 pages to be in the activated open page state in the memory system. A read or write instruction from the memory controller 190 can result in the activation of a page in the appropriate sense amplifier 430 in a RDRAM device 400, memory bank 425 and row. When the new page is activated, a unique identifier, preferably the row address 520 of the page, is stored in the page table structure 510.

The page table is organized so that each memory bank 425 of each RDRAM device 400 is assigned a row 520 from the 1024 rows of the page table. In the preferred embodiment, each RIMM 354 contains a maximum of 32 RDRAM device chips 400 and, because of the shared sense amplifier architecture of the RDRAM chip 400, a maximum of 32 memory banks 425 in each RDRAM device 400 can be active at any given time. Thus, the 32 active banks of each RDRAM device 400 can each be assigned a row in the 1024 entry page table 510 (32 RDRAM devices * 32 maximum banks per RDRAM device active at any given time=1024). Each RDRAM device 400 and memory bank 425 combination maps to a unique row 520 of the page table 510 for this direct-mapped arrangement.

A memory request must access the page table 510 to determine the status of the page of memory being accessed. New request are looked-up in the page table by addressing the page table 510 with a (RDRAM device, memory bank) tag. The page row address 520 stored in the page table 510 is compared to the row address of the transaction being looked-up in the page table 510. If there is a match, and the appropriate bit in the bank active table is set while adjacent bits are cleared, then a page hit has occurred. If the page row address 520 stored in the page table 510 does not match the row address of the transaction being looked-up and the appropriate bit in the bank active table is set while adjacent bits are cleared, then the currently open page must be closed before opening the new requested page. Finally, if neither of the appropriate bits in the bank active table 530 is set for the row 520 of the page table 510, indicating that no page from either bank 425 is open in the sense amplifier buffers 430, then the new page requested can be activated immediately without requiring a prior page closure. For the preferred embodiment of shared sense amplifier 435 type RDRAM devices 400 discussed above, neighboring memory banks must have their bank active bit clear 540 to allow activation of the requested page without requiring prior closure of another page residing in the shared sense amplifier.

Bank active table 530 shown in FIG. 5 is preferably a 32×64 bit table indicating the current banks having activated pages. Each row of the bank active table 530 corresponds to a different RDRAM device chip 400 on a RIMM 354. In the preferred embodiment, because each RDRAM device chip 400 includes 64 memory banks 425, 64 columns are present to identify each memory bank 425 in the RDRAM device 400. Because of the shared sense amplifier architecture 435 of the preferred embodiment, it is not possible for more than 32 banks to have active pages in the 64 memory bank RDRAM device 400. However, all 64 memory banks must be tracked in the bank active table in order to determine which specific banks have active pages. The bank active table because of the shared sense amplifier architecture can never have two sequential ones (i.e., 1-1-0 or 0-1-1) 540 since this would indicate that adjacent banks sharing a sense amplifier both had active pages.

Figure 6:
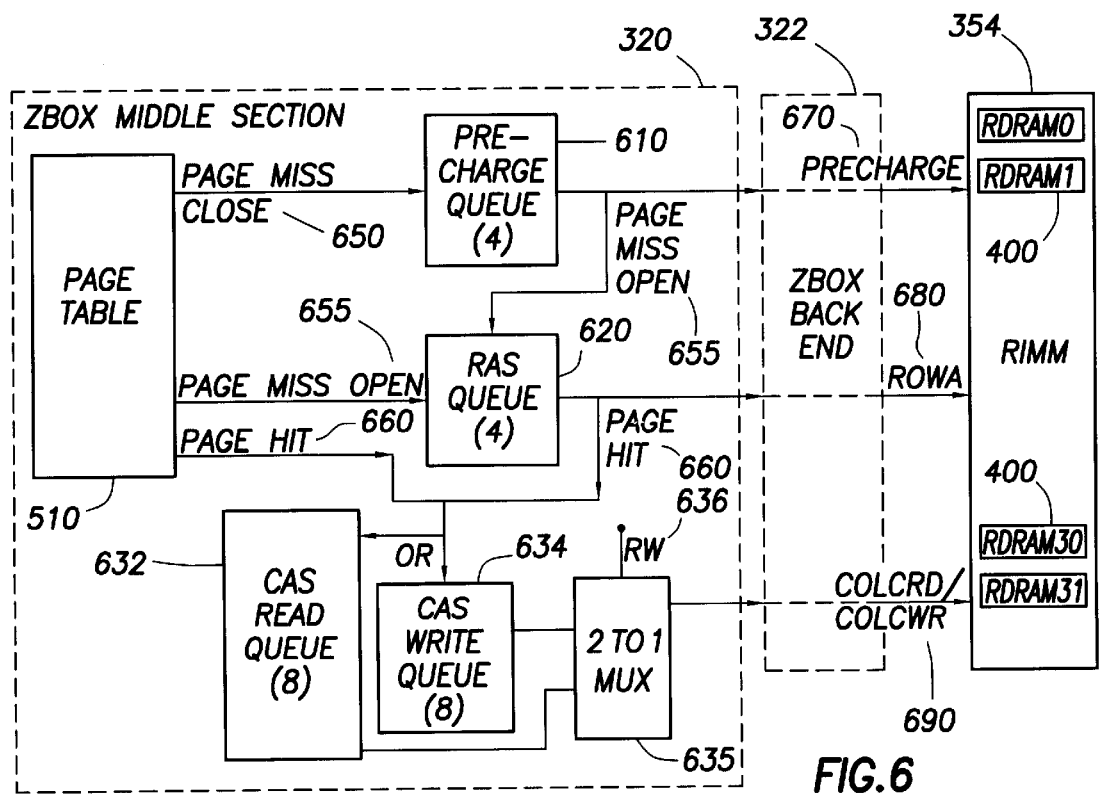
FIG. 6 shows the read request queue and write request queue that permit streaming of groups of read requests and groups of write requests to main memory.

FIG. 6 shows the interaction of the page table with the Precharge 610, RAS 620, CAS Read 632, and CAS Write 634 queues. FIG. 6 includes a page table 510 containing row addresses of newly activated pages, a four entry precharge queue 610, a four entry RAS ("Row-address-select") queue 620, an eight entry CAS ("Column-address-select") Read queue 632 and an eight entry CAS ("Column-address-select") Write queue 634. RAMbus™ Inline Memory Modules ("RIMM") 354 are coupled to the queues and preferably each contain 32 RDRAM devices 400. The page table 510 generates control signals page miss close 650, page miss open 655 and page hit 660 and places the RDRAM device, memory bank and row address into the appropriate queue. The precharge queue 610 and RAS queue 620 generate Precharge 670 and RowA 680 signals, respectively, to the appropriate RDRAM device 400, memory bank 425, row, and column. Either read requests from the CAS Read queue 632 or write requests from the CAS Write queue 634 are selected by the 2-to-1 multiplexer 635 using the RW select line 636 that is controlled by the memory controller. Multiplexer 635 issues streams of ColCRd or ColCWr 690 signals to the appropriate RDRAM device 400, memory bank 425, row, and column to perform each of the functions that are described in greater detail below.

The request queues shown implement a three-tiered structure that hold page miss close 650, page miss open 655 and page hit 660 memory transactions. As discussed above, the page table 510 contains page row addresses 520 of newly activated pages. In one scenario, when a new memory request for a page conflicts with an in-flight memory transaction (i.e., memory transaction in the process of closing, opening or accessing a page in the same sense amplifiers accessed by the new memory request), then the new memory request is rejected to be retried at a later time. The reject mechanism works by comparing a new memory request to all memory requests pending in the precharge queue 610, RAS queue 620, CAS Read queue 632 and CAS Write queue 634 that are implemented as Content-Addressable-Memories ("CAM"). If a match is detected, then the request is rejected to be retried at a later time. A match occurs if the memory request accesses the same sense amplifiers 425 as any pending requests in the precharge 610, RAS 620, CAS Read 632 or CAS Write 634 queues, that is the memory requests are to pages in the same memory bank or adjacent memory banks. In the intervening period before the request is retried, new requests are looked-up in the page table 510 to determine their page status. The result of these lookups can be a page miss close 650, page miss open 655 or a page hit 660.

A page miss close 650 occurs if the requested page is not currently active, and a different page has already been activated into the targeted sense amplifier 430. As mentioned previously, the preferred embodiment supports memory devices that employ sense amplifier sharing between adjacent banks 435. Thus, a memory lookup will result in page miss close 650 if either the memory bank active bit of the targeted bank or adjacent banks is set.

A page miss open 655 occurs if the requested page is not currently active, but the sense amplifier 430 is empty and immediately ready for a new page. For the preferred embodiment of shared sense amplifier memory devices 435, a sense amplifier 430 is considered empty if the sense amplifier 430 is not in use by the targeted bank or the adjacent banks.

A page hit 660 occurs if the requested memory page is already activated in the appropriate sense amplifiers 430 and is ready for immediate access to or from the sense amplifiers 430.

If the memory lookup result is a page hit read or page hit write 660, page miss close 650 or page miss open 655 that does not conflict with any in-flight transactions, the request is allowed to proceed, by loading the memory request into the Precharge 610, RAS 620, CAS Read 632, or CAS Write 634 queues. For each of the four possible memory lookup results discussed above, a corresponding queue to service the request is available. Page hit reads and page hit writes are differentiated by the memory controller and loaded into the appropriate CAS Read 632 or CAS Write 634 queue. A page miss close 650 request generates three transactions in the memory system: (1) closing the old memory page in RDRAM (Precharge queue 610 transaction), (2) opening the desired memory page in RDRAM (RAS queue 620 transaction), and (3) accessing the data from the sense amplifiers in RDRAM (CAS Read queue 632 or CAS Write 634 queue transaction). A page miss open 655 results in (2) opening the desired memory page in RDRAM (RAS queue 620 transaction) and (3) accessing the data from the sense amplifiers in RDRAM (CAS Read queue 632 or CAS Write queue 634 transaction). A page hit 660 requires only (3) accessing the data from the sense amplifiers in RDRAM (CAS Read queue 632 or CAS Write queue 634 transaction).

The request queues contain a total of 24 entries, allocated as follows: four entries for page close in the Precharge queue 610; four entries for page activations in the RAS queue 620; 8 entries for reads that are page hits in the CAS Read queue 632; and 8 entries for writes that are page hits in the CAS Write queue 634.

To complete the page opening process, as transactions are issued from the Precharge queue 610, they are automatically placed into the RAS queue 620. Similarly, as entries are issued from the RAS queue 620, they are automatically placed into the CAS Read queue 632 or CAS Write queue 634 that results in the access of the data in the sense amplifier 430. The CAS Read queue 632 and CAS Write queue 634 that store page hits 660 are the deepest (8 entries each) because they must hold all memory requests which have traveled through the Precharge 610 and RAS 620 queues, as well as directly-enqueued page hits.

Maintaining separate CAS Read and CAS Write queues allows streaming of groups of read requests and groups of write requests to RDRAM devices resulting in many fewer lost clock cycles due to bus turnaround. By discerning between read requests and write requests at the enqueue stage, a 2-to-1 multiplexer can be used to select between reads and writes to be streamed to main memory.

The above discussion is meant to be illustrative of the principles and various embodiments of the present inven-

What is claimed is:

1. A computer system, comprising:
 a processor including a memory controller containing a page table, a precharge queue, a Row-address-select ("RAS") queue, a Column-address-select ("CAS") Read queue, and a CAS Write queue, wherein said page table is organized into a plurality of rows, each row able to store an address of an open memory page;
 a system memory coupled to said processor, said system memory containing a plurality of memory devices, each of said memory devices containing a plurality of memory banks;
 said memory controller receiving a plurality of read requests and write requests; and
 a multiplexer coupled to said CAS Read queue and said CAS Write queue, said multiplexer streaming a group of said read requests and separately streaming a group of said write requests to main memory resulting in fewer bus turnarounds.

2. The computer system of claim 1 wherein said memory controller places system memory read requests into the CAS Read queue and system memory write requests into the CAS Write queue.

3. The computer system of claim 1 wherein said memory controller places read requests or write requests to system memory in the precharge queue resulting from a page miss caused by the address of an open memory page occupying the same row of the page table as the address of the system memory read request or write request resulting in the page miss, each entry in the precharge queue closing the page in the memory bank referenced by the address stored in the page table row.

4. The computer system of claim 1 wherein said memory controller places read requests or write requests to system memory in the RAS queue resulting from a page miss caused by a row of the page table not containing any open memory page address, the entry in said RAS queue activating the page from the memory bank that caused the page miss and storing the page address into the row of the page table not containing any open memory page address to indicate that the page is open.

5. The computer system of claim 3 wherein after closing the page in the memory bank referenced by the address stored in the page table row, the precharge queue places a request in the RAS queue, the request in said RAS queue activating the page from the memory bank that caused the page miss and storing the page address into the row of the page table to indicate an open page.

6. The computer system of claim 5 wherein after storing the page address into the row of the page table to indicate an open page, the RAS queue places a request in the CAS Read queue if the request was to read the page or places a request in the CAS Write queue if the request was to write to the page.

7. A computer system, comprising:
 a processor including a memory controller containing a page table, a first queue, a second queue, a third queue, and a fourth queue, wherein said page table is organized into a plurality of rows, each row able to store an address of an open memory page;
 a system memory coupled to said processor, said system memory containing a plurality of memory devices, each of said memory devices containing a plurality of memory banks;
 a multiplexer coupled to said third queue and said fourth queue, said multiplexer streaming groups of read requests and separately streaming groups of write requests to main memory resulting in fewer bus turnarounds; and
 a disk drive coupled to said processor.

8. The computer system of claim 7 wherein said memory controller places system memory read requests into the third queue and system memory write requests into the fourth queue.

9. A computer system, comprising:
 a processor including a memory controller containing a page table, a first queue, a second queue, a third queue, and a fourth queue, wherein said page table is organized into a plurality of rows, each row able to store an address of an open memory page;
 a system memory coupled to said processor, said system memory containing a plurality of memory devices, each of said memory devices containing a plurality of memory banks; and
 a multiplexer coupled to said third queue and said fourth queue, said multiplexer streaming groups of read requests and separately streaming groups of write requests to main memory resulting in fewer bus turnarounds.

10. The computer system of claim 9 wherein said memory controller places system memory read requests into the third queue and system memory write requests into the fourth queue.

11. The computer system of claim 9 wherein said memory controller places read requests or write requests to system memory in the first queue resulting from a page miss caused by the address of an open memory page occupying the same row of the page table as the address of the system memory read request or write request resulting in the page miss, each entry in the first queue closing the page in the memory bank referenced by the address stored in the page table row.

12. The computer system of claim 9 wherein said memory controller places read requests or write requests to system memory in the second queue resulting from a page miss caused by a row of the page table not containing any open memory page address, the entry in said second queue activating the page from the memory bank that caused the page miss and storing the page address into the row of the page table not containing any open memory page address to indicate that the page is open.

13. The computer system of claim 11 wherein after closing the page in the memory bank referenced by the address stored in the page table row, the first queue places a request in the second queue, the request in said second queue activating the page from the memory bank that caused the page miss and storing the page address into the row of the page table to indicate an open page.

14. The computer system of claim 13 wherein after storing the page address into the row of the page table to indicate an open page, the second queue places a request in the third queue if the request was to read the page or places a request in the fourth queue if the request was to write to the page.

15. A computer system, comprising:
 a processor including a memory controller containing a page table, a precharge queue, a Row-address-select ("RAS") queue, a Column-address-select ("CAS") Read queue, and a CAS Write queue, wherein said page table is organized into a plurality of rows, each row able to store an address of an open memory page;

wherein said precharge queue, RAS queue, CAS read queue and CAS write queue comprise content addressable memory;

a system memory coupled to said processor, said system memory containing a plurality of memory devices, each of said memory devices containing a plurality of memory banks; and a multiplexer coupled to said CAS Read queue and said CAS Write queue, said multiplexer streaming groups of read requests and groups of write requests to main memory resulting in fewer bus turnarounds.

16. The computer system of claim 15 wherein said memory controller places system memory read requests into the CAS Read queue and system memory write requests into the CAS Write queue.

17. The computer system of claim 15 wherein said memory controller places read requests or write requests to system memory in the precharge queue resulting from a page miss caused by the address of an open memory page occupying the same row of the page table as the address of the system memory read request or write request resulting in the page miss, each entry in the precharge queue closing the page in the memory bank referenced by the address stored in the page table row.

18. The computer system of claim 15 wherein said memory controller places read requests or write requests to system memory in the RAS queue resulting from a page miss caused by a row of the page table not containing any open memory page address, the entry in said RAS queue activating the page from the memory bank that caused the page miss and storing the page address into the row of the page table not containing any open memory page address to indicate that the page is open.

19. The computer system of claim 17 wherein after closing the page in the memory bank referenced by the address stored in the page table row, the precharge queue places a request in the RAS queue, the request in said RAS queue activating the page from the memory bank that caused the page miss and storing the page address into the row of the page table to indicate an open page.

20. The computer system of claim 19 wherein after storing the page address into the row of the page table to indicate an open page, the RAS queue places a request in the CAS Read queue if the request was to read the page or places a request in the CAS Write queue if the request was to write to the page.

21. A computer system, comprising:

a processor including a memory controller containing a page table, a first queue, a second queue, a third queue, and a fourth queue, wherein said page table is organized into a plurality of rows, each row able to store an address of an open memory page;

wherein said first, second, third, and fourth queues comprise content addressable memory;

a system memory coupled to said processor, said system memory containing a plurality of memory devices, each of said memory devices containing a plurality of memory banks;

a multiplexer coupled to said third queue and said fourth queue, said multiplexer streaming groups of read requests and groups of write requests to main memory resulting in fewer bus turnarounds; and a disk drive coupled to said processor.

22. The computer system of claim 21 wherein said memory controller places system memory read requests into the third queue and system memory write requests into the fourth queue.

23. A computer system, comprising:

a processor including a memory controller containing a page table, a first queue, a second queue, a third queue, and a fourth queue, wherein said page table is organized into a plurality of rows, each row able to store an address of an open memory page;

wherein said first, second, third, and fourth queues comprise content addressable memory;

a system memory coupled to said processor, said system memory containing a plurality of memory devices, each of said memory devices containing a plurality of memory banks; and a multiplexer coupled to said third queue and said fourth queue, said multiplexer streaming groups of read requests and groups of write requests to main memory resulting in fewer bus turnarounds.

24. The computer system of claim 23 wherein said memory controller places system memory read requests into the third queue and system memory write requests into the fourth queue.

25. The computer system of claim 23 wherein said memory controller places read requests or write requests to system memory in the first queue resulting from a page miss caused by the address of an open memory page occupying the same row of the page table as the address of the system memory read request or write request resulting in the page miss, each entry in the first queue closing the page in the memory bank referenced by the address stored in the page table row.

26. The computer system of claim 23 wherein said memory controller places read requests or write requests to system memory in the second queue resulting from a page miss caused by a row of the page table not containing any open memory page address, the entry in said second queue activating the page from the memory bank that caused the page miss and storing the page address into the row of the page table not containing any open memory page address to indicate that the page is open.

27. The computer system of claim 25 wherein after closing the page in the memory bank referenced by the address stored in the page table row, the first queue places a request in the second queue, the request in said second queue activating the page from the memory bank that caused the page miss and storing the page address into the row of the page table to indicate an open page.

28. The computer system of claim 27 wherein after storing the page address into the row of the page table to indicate an open page, the second queue places a request in the third queue if the request was to read the page or places a request in the fourth queue if the request was to write to the page.

* * * * *